United States Patent
Seo et al.

(10) Patent No.: US 12,209,166 B2
(45) Date of Patent: Jan. 28, 2025

(54) METHOD FOR MANUFACTURING FIBER-REINFORCED RESIN COMPOSITE, FIBER-REINFORCED RESIN COMPOSITE AND MOLDED PRODUCT

(71) Applicant: GS CALTEX CORPORATION, Seoul (KR)

(72) Inventors: Joung-Tae Seo, Daejeon (KR); Seung-Jae Lee, Seoul (KR); Woong-Jae Boo, Namyangju-si (KR)

(73) Assignee: GS CALTEX CORPORATION, Seoul (KR)

( * ) Notice: Subject to any disclaimer, the term of this patent is extended or adjusted under 35 U.S.C. 154(b) by 1192 days.

(21) Appl. No.: 15/762,957

(22) PCT Filed: Sep. 26, 2016

(86) PCT No.: PCT/KR2016/010728
§ 371 (c)(1),
(2) Date: Mar. 23, 2018

(87) PCT Pub. No.: WO2017/052315
PCT Pub. Date: Mar. 30, 2017

(65) Prior Publication Data
US 2018/0273709 A1    Sep. 27, 2018

(30) Foreign Application Priority Data
Sep. 25, 2015  (KR) .................. 10-2015-0136693

(51) Int. Cl.
*C08J 5/08*  (2006.01)
*B29B 15/12* (2006.01)
(Continued)

(52) U.S. Cl.
CPC .............. *C08J 5/08* (2013.01); *B29B 15/127* (2013.01); *B29B 15/14* (2013.01);
(Continued)

(58) Field of Classification Search
CPC ........ C08J 5/06; C08J 5/24; C08J 5/08; C03C 25/25; C03C 25/465; B29B 15/127; B29B 15/14; B29C 45/0005; C03B 37/04
(Continued)

(56) References Cited

U.S. PATENT DOCUMENTS 6,222,007 B1    4/2001  Cano et al.
6,228,492 B1 *  5/2001  Kinlen ................ D06M 15/227
                                                264/131
(Continued)

FOREIGN PATENT DOCUMENTS

CN    101535382 A    9/2009
CN    102105946 A    6/2011
(Continued)

OTHER PUBLICATIONS

Machine Translation KR 10-20110046449 A (Year: 2011).*
(Continued)

*Primary Examiner* — Peter Y Choi
(74) *Attorney, Agent, or Firm* — Hauptman Ham, LLP

(57) ABSTRACT

Provided are a method for manufacturing a fiber-reinforced resin composite, a fiber-reinforced resin composite manufactured by the manufacturing method, and a molded product, the method comprising the steps of: spinning a fiber filament; coating a surface of the fiber filament by spraying an impregnation resin emulsion onto the spun fiber filament; and forming a fiber strand by bundling the surface-coated fiber filament.

5 Claims, 3 Drawing Sheets

(51) Int. Cl.

| | | |
|---|---|---|
| *B29B 15/14* | (2006.01) | |
| *B29C 45/00* | (2006.01) | |
| *B29K 309/08* | (2006.01) | |
| *C03B 37/04* | (2006.01) | |
| *C03C 25/1095* | (2018.01) | |
| *C03C 25/25* | (2018.01) | |
| *C03C 25/30* | (2018.01) | |
| *C03C 25/465* | (2018.01) | |
| *C08J 5/06* | (2006.01) | |
| *C08J 5/24* | (2006.01) | |

(52) U.S. Cl.
CPC .......... *B29C 45/0005* (2013.01); *C03B 37/04* (2013.01); *C03C 25/1095* (2013.01); *C03C 25/25* (2018.01); *C03C 25/30* (2013.01); *C03C 25/465* (2018.01); *C08J 5/06* (2013.01); *C08J 5/244* (2021.05); *C08J 5/249* (2021.05); *B29K 2309/08* (2013.01); *B29K 2995/0077* (2013.01); *B29K 2995/0089* (2013.01); *C08J 2323/12* (2013.01); *C08J 2423/12* (2013.01); *Y02P 40/57* (2015.11)

(58) Field of Classification Search
USPC ........................................................ 428/375
See application file for complete search history.

(56) References Cited

U.S. PATENT DOCUMENTS

| | | | |
|---|---|---|---|
| 6,388,023 | B1 | 5/2002 | Hsu et al. |
| 6,660,373 | B2 | 12/2003 | Hsu et al. |
| 10,920,009 | B2 | 2/2021 | Ogasawara et al. |
| 2006/0147706 | A1 | 7/2006 | Moireau et al. |
| 2006/0235169 | A1 * | 10/2006 | Yamasaki .......... C08G 73/0266 525/540 |

FOREIGN PATENT DOCUMENTS

| | | | | | |
|---|---|---|---|---|---|
| CN | 203778204 | U | * | 8/2014 | |
| EP | 1366826 | A1 | * | 12/2003 | ......... B05B 13/0214 |
| EP | 1457466 | A2 | | 9/2004 | |
| FR | 2865480 | A1 | * | 7/2005 | ............ C08L 53/00 |
| JP | 02-095476 | A | | 4/1990 | |
| JP | 10-0221361 | B1 | | 9/1999 | |
| JP | 2003-166174 | A | | 6/2003 | |
| JP | 2005-170691 | A | | 6/2005 | |
| JP | 2005-187737 | A | | 7/2005 | |
| JP | 2005-289698 | A | | 10/2005 | |
| JP | 2005-538917 | A | | 12/2005 | |
| JP | 2006-037294 | A | | 2/2006 | |
| JP | 2008-518879 | A | | 6/2008 | |
| JP | 2008-260229 | A | | 10/2008 | |
| JP | 2009-084116 | A | | 4/2009 | |
| JP | 2010-013789 | A | | 1/2010 | |
| JP | 2013-133378 | A | | 7/2013 | |
| JP | 2014-009637 | A | | 1/2014 | |
| JP | 5676080 | B2 | | 2/2015 | |
| JP | 2015-512331 | A | | 4/2015 | |
| KR | 10-0880805 | B1 | | 1/2009 | |
| KR | 10-2011-0046449 | A | | 5/2011 | |
| KR | 20110046449 | A | * | 5/2011 | ........... B29B 15/127 |

OTHER PUBLICATIONS

Textile Product Guide by Lubrizol (Year: 2021).*
The International Search Report for PCT/KR2016/010728 mailed on Jan. 12, 2017.
Japanese Office Action dated Apr. 19, 2019, in connection with counterpart Japanese Patent Application No. 2018-515492.
Chinese Office Action dated Apr. 3, 2019, in connection with counterpart Chinese Patent Application No. 201680055977.0.
Xing Liying, "Automated Manufacturing Technologies for Advanced Resin-based Composites", Technology Series of Chief Experts from Aviation Industry Corporation of China, Ltd. (AVIC) National, Jun. 2014.
ISO 2555:2018, "Plastics—Resins in the liquid state or as emulsions or dispersions—Determination of apparent viscosity using a single cylinder type rotational viscometer method," International Organization for Standardization (ISO), 2018, p. v (Introduction section).
S. V. Gupta, "Viscometry for Liquids—Calibration of Viscometers," Springer Series in Materials Science, 2014, vol. 194, pp. 227-230 (DOI: 10.1007/978-3-319-04858-1).

* cited by examiner

METHOD FOR MANUFACTURING FIBER-REINFORCED RESIN COMPOSITE, FIBER-REINFORCED RESIN COMPOSITE AND MOLDED PRODUCT

CROSS REFERENCE TO RELATED APPLICATION

This present application is a national stage filing under 35 U.S.C § 371 of PCT application number PCT/KR2016/010728 filed on Sep. 26, 2016 which is based upon and claims the benefit of priority to Korean Patent Application No. 10-2015-0136693 filed on Sep. 25, 2015 in the Korean Intellectual Property Office. The disclosures of the above-listed applications are hereby incorporated by reference herein in their entirety.

TECHNICAL FIELD

The present invention relates to a method for manufacturing a fiber-reinforced resin composite, a fiber-reinforced resin composite and a molded product.

BACKGROUND ART

A fiber-reinforced resin composite means a composite that contains resin as a base material and contains fibers as a reinforcing material, for example, and may be referred to as a so-called fiber-reinforced plastic.

In general, fiber filaments are easily scattered and entangled, so that they are employed as fiber strands or fiber bundles formed using a binder, a binding agent or the like. The above-mentioned fiber-reinforced resin composite is produced through a process of infiltrating or impregnating resin between fiber strands or fiber bundles.

In this regard, as the resin is more easily infiltrated or impregnated between the fiber strands or the fiber bundles, that is, as the efficiency of the impregnation process increases, the content of fibers contained in the fiber-reinforced resin composite which is to be produced may increase, and in addition, the dispersibility of fibers may also be enhanced. Therefore, a molded product produced therefrom may have better physical properties, for example tensile strength, impact strength and the like.

However, as described above, since the fiber strands or fiber bundles are bound by the binder or binding agent, it is difficult for the resin to be infiltrated or impregnated into the fiber strands or fiber bundles during the impregnation process. Thereby, the fiber-reinforced resin composite is inevitably manufactured with a relatively thick resin layer formed on an outer surface of the fiber strand or fiber bundle. In this case, it is impossible to increase the content of fibers contained in the fiber-reinforced resin composite beyond a certain level, in consideration of the dispersibility of fibers or the like.

Thus, recently, there has been used a method of increasing the efficiency of the impregnation process by opening or widening fiber strands or fiber bundles and then impregnating resin therein. Specifically, as the content of a binding agent or the like used to form the fiber strands or fiber bundles increases, it is difficult to open or widen the fiber strands or fiber bundles. Therefore, research is continuously made to open or widen the fiber strands or fiber bundles to a larger extent by minimizing the content of the binding agent.

However, such a method of performing the impregnation process after opening or widening fiber strands or bundles is problematic in that the efficiency of the impregnation process is insufficient, and thus it is difficult to increase the content of fibers contained in the fiber-reinforced resin composite to a desired level.

DISCLOSURE

Technical Problem

An aspect of the present invention is intended to provide a method for manufacturing a fiber-reinforced resin composite, which is capable of effectively improving a degree to which resin is impregnated in a fiber strand, that is, an efficiency of impregnating resin in a fiber strand, and simultaneously simplifying a manufacturing process, thus further saving time and cost.

Another aspect of the present invention is intended to provide a fiber-reinforced resin composite, in which impregnation resin can be sufficiently and more uniformly impregnated between fiber filaments, thus allowing fibers to be contained in a higher content.

A further aspect of the present invention is intended to provide a molded product, which can be used for a variety of purposes by properly adjusting physical properties such as tensile strength and impact strength in a wider range, while realizing excellent production efficiency and economic efficiency.

However, the technical problems to be solved by the present invention are not limited to the above-mentioned problems, and other unmentioned problems may be clearly understood by those skilled in the art from the following description.

Technical Solution

In an aspect, the present invention provides a method for manufacturing a fiber-reinforced resin composite including the steps of: spinning a fiber filament; coating a surface of the fiber filament by spraying an impregnation resin emulsion onto the spun fiber filament; and foaming a fiber strand by bundling the surface-coated fiber filament.

According to the manufacturing method, at the step of spinning the fiber filament prior to foaming the fiber strand, the surface of the fiber filament may be coated by spraying the impregnation resin emulsion, and subsequently, the fiber strand may be formed from the surface-coated fiber filament.

Thus, since the fiber strand famed by the manufacturing method may impregnate a sufficient amount of the impregnation resin between the fiber filaments, a higher content of fibers may be favorably contained in the fiber strand.

Further, the manufacturing method is capable of eliminating the step of opening or widening the bound fiber strand again and then passing or immersing the fiber strand through or in a separate resin impregnation bath. Consequently, a manufacturing process is simplified, and thereby both production efficiency and economic efficiency are effectively improved.

At the step of coating the surface of the fiber filament, the surface of the fiber filament may be coated to a thickness of about 0.03 μm to about 5.5 μm.

The coating having the thickness of the above-described range allows a sufficient content of the impregnation resin to be present between the fiber filaments in the fiber strand, thus realizing excellent impregnation efficiency, and allows the fiber filaments to be spaced apart from each other at uniform intervals, thus effectively improving the dispersibility of fibers.

In another aspect, the present invention provides a fiber-reinforced resin composite manufactured by the above-described method, the composite including a fiber strand having fiber filaments, a separation distance between the fiber filaments present in impregnation resin ranging from about 0.06 µm to about 11 µm.

The separation distance of the above-described range allows the impregnation resin to be sufficiently and uniformly present between the fiber filaments in the fiber strand, thus being capable of containing a relatively higher content of fibers, and improving the dispersibility of the fibers. Further, it is possible to properly adjust the physical properties of a molded product made therefrom in a wider range, and to realize excellent production efficiency and economic efficiency.

To be more specific, if the separation distance is less than about 0.06 µm, the surface of the fiber filament 120 is not sufficiently coated, so that the impregnation degree of the impregnation resin may be lowered and fibers may be scattered during a work. In contrast, if the separation distance is more than about 11 µm, the content of the fibers may become too low.

Further, the content of the fiber filaments in the fiber-reinforced resin composite may range from about 79% to about 99.8% by weight, for example. Particularly, this content may range from about 92.3% to 99.8% by weight.

If a higher content of the fiber filaments within the above-described range is contained, it is possible to properly adjust the physical properties of the molded product made of the fiber-reinforced resin composite in a wider range, and to realize excellent production efficiency and economic efficiency.

Advantageous Effects

The method for manufacturing the fiber-reinforced resin composite is capable of effectively improving the efficiency of impregnating the resin in the fiber strand, and simultaneously simplifying the manufacturing process, thus further saving time and cost.

Further, the fiber-reinforced resin composite allows the impregnation resin to be sufficiently and more uniformly impregnated between the fiber filaments, thus enabling fibers to be contained in a higher content.

Furthermore, the molded product can be used for a variety of purposes by properly adjusting the physical properties such as the tensile strength and the impact strength in a wider range, and can realize excellent production efficiency and economic efficiency.

MODE FOR INVENTION

Figure 1:
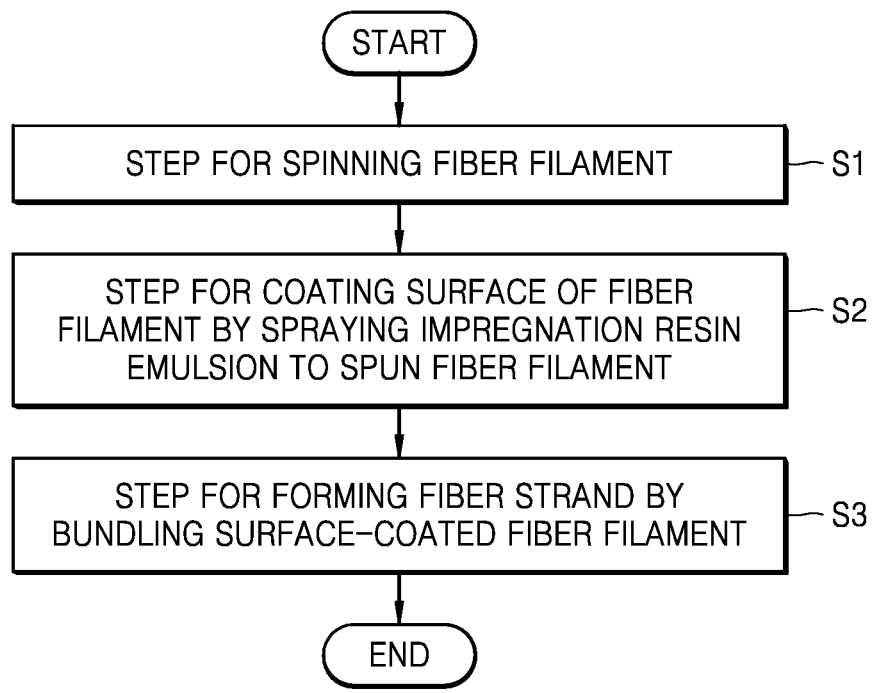
FIG. 1 is a schematic process flowchart illustrating a method for manufacturing a fiber-reinforced resin composite according to an embodiment of the present invention.

Hereinafter, the present invention will be described in more detail with reference to the accompanying drawings, in which exemplary embodiments of the invention are shown. The invention may be implemented in various ways without being limited to the described embodiments.

In order to clearly illustrate the present invention, parts that are not related to the description are omitted, and the same or similar components are denoted by the same reference numerals throughout the specification.

In the drawings, thicknesses are enlarged to clearly indicate layers and regions. In the drawings, for the convenience of explanation, the thicknesses of some layers and regions are exaggerated.

FIG. 1 schematically illustrates a process flowchart of a method for manufacturing a fiber-reinforced resin composite according to an embodiment of the present invention.

The manufacturing method includes a step S1 of spinning a fiber filament; a step S2 of coating a surface of the fiber filament by spraying an impregnation resin emulsion onto the spun fiber filament; and a step S3 of forming a fiber strand by bundling the surface-coated fiber filament.

In general, since a fiber strand or fiber bundle is bound by a binder or binding agent, it is difficult for resin to be infiltrated or impregnated into the fiber strand or fiber bundle during an impregnation process. Thereby, a fiber-reinforced resin composite is inevitably manufactured with a relatively thick resin layer formed on an outer surface of the fiber strand or fiber bundle. In this case, it is impossible to increase the content of fibers contained in the fiber-reinforced resin composite beyond a certain level, in consideration of the dispersibility of fibers or the like.

Thus, recently, there has been used a method of increasing the efficiency of the impregnation process by opening or widening fiber strand or fiber bundle and then impregnating resin therein. Specifically, as the content of a binding agent or the like used to form the fiber strand or fiber bundle increases, it is difficult to open or widen the fiber strand or fiber bundle. Therefore, research is continuously made to open or widen the fiber strand or fiber bundle to a larger extent by minimizing the content of the binding agent.

However, such a method of performing the impregnation process after opening or widening the fiber strand or bundle is problematic in that the efficiency of the impregnation process is insufficient, and thus it is difficult to increase the content of fibers contained in the fiber-reinforced resin composite to a desired level.

In addition, a process for manufacturing the fiber-reinforced resin composite using the above-described method in which the fiber strand is opened or widened and then impregnated essentially involves a step of forming a fiber strand or fiber bundle by bundling fiber filaments; and passing or immersing the fiber strand or fiber bundle through or in an impregnation bath containing liquid impregnation resin after opening or widening the formed fiber strand or bundle. The manufacturing process is divided into two steps, so that time and cost required to perform the manufacturing process are increased, and consequently production efficiency and economic efficiency are lowered.

Thus, according to an embodiment of the present invention, at the step of spinning the fiber filament prior to forming the fiber strand, the surface of the fiber filament may be coated by spraying the impregnation resin emulsion, and subsequently, the fiber strand may be formed by bundling the surface-coated fiber filament.

Thus, since the fiber strand famed by the manufacturing method may impregnate a sufficient amount of the impregnation resin between the fiber filaments, a higher content of fibers may be favorably contained in the fiber strand.

Further, this manufacturing method is capable of eliminating the step of opening or widening the bound fiber strand again and then passing or immersing the fiber strand through or in a separate resin impregnation bath. Therefore, the manufacturing process is simplified, and thereby both production efficiency and economic efficiency are effectively improved.

In the above manufacturing method, fiber filament may be spun. The spinning of the fiber filament may be performed using a fiber spinning machine known in the art, for example, a bushing, without being limited thereto.

The fiber filament may be spun at a speed of for example, from about 400 m/min to about 700 m/min.

The diameter of the fiber filament may be appropriately adjusted and simultaneously the breaking of the fiber filament may prevented by spinning the fiber filament at the spinning speed within the above range, thus improving workability.

Further, the sectional diameter of the fiber filament may range from, for example, about 10 μm to about 30 μm, without being limited thereto.

The fiber filament may include either or both organic fiber and inorganic fiber. Specifically, the fiber filament may be made of a material including at least one selected from a group consisting of, but not limited to, glass fiber, carbon fiber, aramid fiber, polyethylene fiber, polyester fiber, polyamide fiber, nylon fiber, natural fiber, basalt fiber and combinations thereof.

In the above manufacturing method, the surface of the fiber filament may be coated by spraying the impregnation resin emulsion onto the fiber filament to be spun. Further, the surface-coated fiber filament may be bundled to form the fiber strand.

Thus, it is unnecessary to additionally apply the process in which the fiber strand is formed by coating the surface with the impregnation resin emulsion prior to bundling the fiber filament, the fiber strand is opened or widened again and then is passed through or immersed in a separate impregnation bath containing liquid impregnation resin.

Unlike the conventional method where it is difficult to infiltrate the impregnation resin into the fiber strand thereby the efficiency of the impregnation process is very low, the present manufacturing method allows the impregnation resin to be sufficiently and more uniformly present between fiber filaments in the fiber strand, so that the fiber strand may contain a higher content of fibers.

According to an embodiment, the method may further include a step of performing a step of spraying the impregnation resin emulsion onto the surface-coated fiber filament again to coat the surface one or more times, before the step of forming the fiber strand.

Thus, the content of the impregnation resin impregnated in the fiber strand may be appropriately increased for the purpose and use of the invention, so that the physical properties of the fiber stand may be easily adjusted and thereby it may be applied for various purposes.

For example, the step of coating the surface by spraying the impregnation resin emulsion onto the surface-coated fiber filament again may be repeated two to five times.

By repeating the step the above-described number of times, the content of the impregnation resin in the fiber strand may be appropriately increased, and simultaneously the content of fiber may be still maintained at a high level.

The impregnation resin emulsion may include the impregnation resin, and the impregnation resin may include thermoplastic resin.

Examples of the thermoplastic resin may include at least one selected from a group consisting of, but not limited to, urethane resin, acrylic resin, polyamide resin, polyester resin, polyether resin, polypropylene-polyethylene resin, polypropylene resin, polyethylene terephthalate resin, polybutylene terephthalate resin, polystyrene resin, acrylonitrile-styrene resin, acrylonitrile-butadiene-styrene resin, polyphenylene sulfide resin, nylon resin, polyether imide resin, and combinations thereof.

Further, the thermoplastic resin may be made, for example, in the form of particles to assume the form of thermoplastic resin particles, and the average particle size of the thermoplastic resin particles may range from about 100 nm to about 100 μm.

By having the average particle size within the above range, the particle size of the thermoplastic resin may be appropriately adjusted to realize excellent coatability, thereby realizing more uniform physical properties of a product and improving reliability.

The impregnation resin emulsion used to coat the surface of the fiber filament may contain the impregnation resin of about 1.75 wt % to about 7.0 wt %, without being limited thereto.

By containing the impregnation resin within the above range, it is possible to sufficiently coat the surface of the fiber filament with the impregnation resin and to properly adjust the viscosity of the impregnation resin emulsion, thus allowing the impregnation resin emulsion to be easily sprayed.

The viscosity of the impregnation resin emulsion may range from about 300 cP to about 10,000 cP at about 25° C. By having the viscosity within the above range, the surface of the fiber filament may be sufficiently coated and the spraying from the spraying device may be facilitated.

Further, at the step of coating the surface of the fiber filament, the temperature of the impregnation resin emulsion to be sprayed may range from about 5° C. to about 50° C., for example.

The impregnation resin emulsion may further include at least one selected from a group consisting of, for example, diluent, a coupling agent, a surfactant, an antistatic agent, an antioxidant, a heat stabilizer and a combination thereof.

The diluent may be, for example, water but is not limited thereto.

At the step of coating the surface of the fiber filament, the impregnation resin emulsion may contain no binding agent, or may further contain a binding agent therein.

According to an embodiment, since the impregnation resin coated on the surface of the fiber filament has a predetermined viscosity, it is possible to bundle the fiber filament without a separate binding agent.

Particularly, in the process of bundling the fiber filament, it is possible to easily bundle the surface-coated fiber filament and form the fiber strand without the necessity of applying a separate binding process of treating the fiber filament with the binding agent.

Further, the impregnation resin emulsion may further include the above-mentioned binding agent according to the purpose and use of the invention. The content of the binding agent that may be contained may be appropriately selected in a wider range from a low content to a high content without being limited to a low content.

As the content of the binding agent is increased, the scattering or entanglement of the fiber filament is reduced during a work. Therefore, it is possible to prevent the loss of the fiber material and to improve working environment.

Examples of the binding agent may include at least one selected from a group consisting of γ-aminopropyltriethoxysilane, N-β-(aminoethyl)-γ-aminopropyltriethoxysilane, N-β-(aminoethyl)-N'-β-(aminoethyl)-γ-aminopropyltriethoxysilane, anilinopropyltrimethoxysilane, γ-glycidoxypropyltrimethoxysilane, β-(3,4-epoxycyclohexyl)ethyltrimethoxysilane, vinyltrimethoxysilane, N-β-(N-vinylbenzylaminoethyl)-γ-aminopropyltrimethoxysilane, and hydrolysates thereof, without being limited thereto.

The method of spraying the impregnation resin emulsion may be performed using a spraying device known in the art, for example, spraying device equipped with spray nozzle, without being particularly limited thereto.

Further, at the step of coating the surface of the fiber lament, the impregnation resin emulsion may be sprayed at the spraying angle of about 30° to about 150°, particularly about 80° to about 120°.

Figure 3:
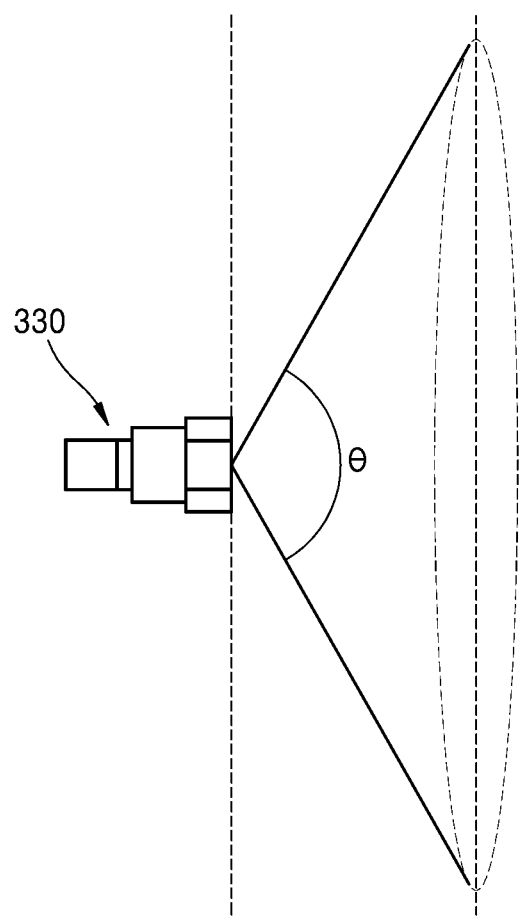
FIG. 3 is a schematic view illustrating a spraying angle of a spraying device.

The spraying angle may be expressed as shown in FIG. 3, and may be, for example, the angle of a pattern that is drawn by liquid sprayed from the spray nozzle. This may be referred to as a so-called injection angle.

By spraying the impregnation resin emulsion at the spraying angle (θ) of the above range, cooling effect may be enhanced when the surface of the fiber filament is coated, and the clogging of the spray nozzle may be prevented, thus further extending the life span of the spraying device.

To be more specific, if the spraying angle is less than about 30°, the impregnation resin emulsion may be agglomerated, thus leading to a considerable reduction in coatability. Meanwhile, if the spraying angle is more than about 150°, cooling efficiency is considerably lowered.

According to an embodiment, at the step of coating the surface of the fiber filament, the surface of the fiber filament may be coated to the thickness of about 0.03 μm to about 5.5 μm, particularly about 0.10 μm to about 2 μm.

By coating the surface to the thickness within the above range, a sufficient content of impregnation resin is present between the fiber filaments in the fiber strand, so that excellent impregnation efficiency is realized and thereby it is possible to contain fiber at a high content. Further, since the fiber filaments may be arranged at uniform intervals, the dispersibility of fiber may also be improved.

As described above, the fiber strand may be formed by bundling the surface-coated fiber filament. Thus, the fiber strand may be formed to include the impregnation resin and the fiber filament present in the impregnation resin.

Further, the separation distance between the fiber filaments present in the impregnation resin may be in the range of about 0.06 μm to about 11 μm, particularly about 0.20 μm to about 4.0 μm. The separation distance may mean an average distance or an average interval between neighboring fiber filaments.

The separation distance of the above range allows the impregnation resin to be sufficiently and uniformly present between the fiber filaments in the fiber strand, so that it is possible to contain fiber at a relatively higher content and to improve the dispersibility of fiber.

Further, at the step of forming the fiber strand, the fiber strand may be formed such that a weight ratio of the impregnation resin to the fiber filament ranges from about 1:3.7 to about 1:998.

The weight ratio of the above range enables the impregnation resin to be sufficiently present between the fiber filaments, thus effectively improving the impregnation efficiency, as described above.

Further, the fiber strand may be formed such that the content of the fiber filaments contained therein may range from, for example, about 79 wt % to about 99.8 wt %, and particularly about 92.3 wt % to about 99.8 wt %.

By forming the fiber strand to contain a high content of fiber filaments within the above range, the molded product formed by the fiber-reinforced resin composite may appropriately adjust its physical properties in a wider range, and excellent production efficiency and economic efficiency may be achieved.

The number of bundled fiber filaments per fiber strand may range from 500 to 6,000, without being limited thereto.

The manufacturing method may further include a step of forming a continuous fiber-reinforced resin composite by winding and arranging the fiber strand, or forming a long fiber-reinforced resin composite by cutting the fiber strand.

That is, the fiber strand itself may be used as the continuous fiber-reinforced resin composite. In this case, the fiber strand may be wound around a certain bobbin to be stored, and then a proper length of fiber strand may be used according to the purpose and use of the invention. Further, the fiber strand may be cut to a shorter length as compared to the case using the continuous fiber-reinforced resin composite, thus forming the long fiber-reinforced resin composite.

The long fiber-reinforced resin composite may be in the form of a pellet.

In the case of forming the long fiber-reinforced resin composite by cutting the fiber strand, it may be cut to have the length of about 3 mm to about 100 mm. Thus, the length of the long fiber filament contained in the fiber-reinforced resin composite may be properly adjusted.

The long fiber-reinforced filament contained in the long fiber-reinforced resin composite may be formed such that a length thereof ranges from, for example, about 0.5 mm to about 30 mm. By having the length of such a range, mechanical and thermal properties of the fiber-reinforced resin composite may be appropriately adjusted.

Figure 2:
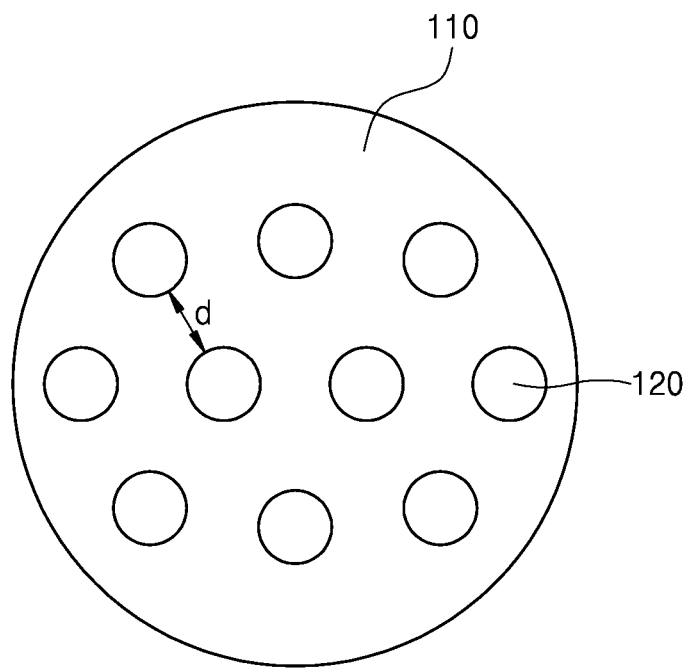
FIG. 2 is a schematic sectional view illustrating a fiber-reinforced resin composite according to another embodiment of the present invention.

FIG. 2 is a schematic sectional view illustrating a fiber-reinforced resin composite 100 according to another embodiment of the present invention.

Another embodiment of the present invention provides the fiber-reinforced resin composite 100 manufactured by the above-described method, the composite including a fiber strand having fiber filaments, a separation distance d between the fiber filaments 120 present in impregnation resin 110 ranging from about 0.06 μm to about 11 μm. Particularly, the separation distance d may range from about 0.20 μm to about 4.0 μm.

The separation distance d of the above-described range allows the impregnation resin 110 to be sufficiently and uniformly present between the fiber filaments 120 in the fiber strand, thus being capable of containing a relatively higher content of fibers, and improving the dispersibility of the fibers. Further, it is possible to properly adjust the physical properties of a molded product made therefrom in a wider range, and to realize excellent production efficiency and economic efficiency.

To be more specific, if the separation distance d is less than about 0.06 μm, the surface of the fiber filament 120 is not sufficiently coated, so that the impregnation degree of the impregnation resin 110 may be lowered and fibers may be scattered during a work. In contrast, if the separation distance d is more than about 11 μm, the content of the fibers may become too low.

The impregnation resin 110 and the fiber filament 120 remain the same as the preceding embodiment.

In the fiber-reinforced resin composite 100, the weight ratio of the impregnation resin 110 to the fiber filament 120 ranges from about 1:3.7 to about 1:998. The weight ratio of the above range enables the impregnation resin 110 to be sufficiently present between the fiber filaments 120, thus effectively improving the impregnation efficiency, as described above.

Further, in the fiber-reinforced resin composite 100, the content of the fiber filaments 120 may range from, for example, about 79 wt % to about 99.8 wt %, and particularly about 92.3 wt % to about 99.8 wt %.

By containing a high content of fiber filaments 120 within the above range, the molded product formed by the fiber-reinforced resin composite 100 may appropriately adjust its physical properties in a wider range, and excellent production efficiency and economic efficiency may be achieved.

The fiber-reinforced resin composite 100 may contain no binding agent, or may further contain a binding agent therein. The binding agent remains the same as the preceding embodiment.

Thus, the fiber-reinforced resin composite 100 may appropriately adjust the presence and content of the binding agent according to the purpose and use of the invention. Here, the content of the binding agent that may be contained may be appropriately selected in a wider range from a low content to a high content without being limited to a low content.

As the content of the binding agent is increased, the scattering or entanglement of the fiber filament 120 is reduced during a work. Therefore, it is possible to prevent the loss of the fiber material and to improve working environment.

The fiber-reinforced resin composite 100 may be either a continuous fiber-reinforced resin composite formed by winding and arranging the fiber strand, or a long fiber-reinforced resin composite formed by cutting the fiber strand.

That is, the fiber strand itself may be used as the continuous fiber-reinforced resin composite. In this case, the fiber strand may be wound around a certain bobbin to be stored, and then a proper length of fiber strand may be used according to the purpose and use of the invention. Further, the fiber strand may be cut to a shorter length as compared to the case using the continuous fiber-reinforced resin composite, thus forming the long fiber-reinforced resin composite.

When the fiber-reinforced resin composite 100 is the long fiber-reinforced resin composite, it may have the length of about 3 mm to about 100 mm. Thus, the length of the long fiber filament contained in the fiber-reinforced resin composite may be properly adjusted.

The long fiber-reinforced filament contained in the long fiber-reinforced resin composite may have the length of about 0.5 mm to about 30 mm, for example. By having the length of such a range, mechanical and thermal properties of the fiber-reinforced resin composite may be appropriately adjusted.

Further, the long fiber-reinforced resin composite may be in the form of a pellet, without being limited thereto.

The fiber-reinforced resin composite 100 may be applied to various applications, for example, automobile interior and exterior materials, interior and exterior materials for household appliances, interior and exterior materials for construction, and other industrial fields.

Another embodiment of the present invention provides a molded product manufactured by injection-molding the fiber-reinforced resin composite.

As described above, since the fiber-reinforced resin composite may sufficiently impregnate the impregnation resin between fiber filaments, it is possible to contain a higher content of fibers. Thus, the molded product made from the fiber-reinforced resin composite may appropriately adjust its physical properties in a wider range, while realizing excellent production efficiency and economic efficiency.

Further, the molded product may be manufactured by injection-molding a mixture obtained by mixing the fiber-reinforced resin composite with thermoplastic resin. For example, the molded product may be manufactured by injection-molding a mixed composition obtained by mixing the fiber-reinforced resin composite with the thermoplastic resin.

For example, in the case of putting the fiber-reinforced resin composite and the thermoplastic resin pellet into a certain injection-molding machine, they are melted and mixed in the injection-molding machine to produce a mixed composition and the mixed composition is injection-molded to manufacture the molded product.

The thermoplastic resin may use the kind of thermoplastic resin that was already described in the impregnation resin according to the preceding embodiment, without being limited thereto.

As such, in the case of manufacturing the molded product by injection-molding the mixture obtained by mixing the fiber-reinforced resin composite with the thermoplastic resin, the physical properties of the molded product, such as tensile strength or impact strength, may be appropriately adjusted in a wider range from a lower range to a higher range according to the purpose and use of the invention by properly adjusting the content of the thermoplastic resin to be mixed. Thus, the molded product may be used for a variety of purposes.

Further, in the case of mass-producing the molded product by injection-molding the mixture, production efficiency and economic efficiency may be further improved.

To be more specific, as the fiber-reinforced resin composite contains a high content of fiber, it is possible to reduce the overall content of the fiber-reinforced resin composite while increasing the content of the thermoplastic resin, in the case of mass-producing the molded product. Since the thermoplastic resin is simpler in manufacturing process and cheaper in cost than the fiber-reinforced resin composite, the cost and time are further reduced and excellent production efficiency and economical efficiency may be realized.

For example, the molded product may be manufactured by injection-molding a mixture obtained by mixing about 6 to about 1895 parts by weight of thermoplastic resin with 100 parts by weight of fiber-reinforced resin composite.

Thus, the molded product manufactured by injection-molding the mixture may have the tensile strength of about 40 MPa to about 175 MPa, and the impact strength of about 5 MPa to about 35 MPa.

As such, the physical properties of the molded product may be more easily adjusted in a wider range from a lower range to a higher range, it may be applied to a variety of applications according to the purpose and use of the invention.

Hereinafter, examples of the present invention will be described. However, since the following examples are merely illustrative, it is to be understood that the invention is not limited thereto.

EXAMPLES

Example 1

3.0 wt % of polypropylene resin obtained by mixing polypropylene resin having the weight average molecular weight of 70,000 with polypropylene resin having the weight average molecular weight of 20,000 in the ratio of 1:1 as the impregnation resin, 2.0 wt % of hydrolyzed γ-amino propyltriethoxysilane and water were mixed to prepare the impregnation resin emulsion. Here, the viscosity of the impregnation resin emulsion was 6,000 cP at 25° C.

While glass fiber filament was spun at the spinning speed of 600 m/min using the spinning machine, the impregnation resin emulsion was sprayed onto the spun glass fiber filament using the spraying device at the angle of 110°, so that the surface of the glass fiber filament was coated to the thickness of about 1.82 μm.

Subsequently, the glass fiber strand was formed by bundling the surface-coated glass fiber filament, and the fiber-reinforced resin composite was manufactured by cutting the glass fiber strand to the length of 10 mm.

In the fiber-reinforced resin composite, the glass fiber filaments were present in the impregnation resin to be spaced apart from each other by the separation distance of 3.62 μm, the content of the glass fiber filament was 93.0 wt %, the content of the impregnation resin was 4.2 wt %, and the content of the hydrolyzed γ-amino propyltriethoxysilane was 2.8 wt %.

Example 2 (Having a Higher Content of Glass Fiber as Compared to Example 1)

5.0 wt % of polypropylene resin obtained by mixing polypropylene resin having the weight average molecular weight of 70,000 with polypropylene resin having the weight average molecular weight of 20,000 in the ratio of 1:1 as the impregnation resin, 3.3 wt % of hydrolyzed γ-amino propyltriethoxysilane and water were mixed to prepare the impregnation resin emulsion. Here, the viscosity of the impregnation resin emulsion was 7,000 cP at 25° C.

While glass fiber filament was spun at the spinning speed of 600 m/min using the spinning machine, the impregnation resin emulsion was sprayed onto the spun glass fiber filament using the spraying device at the angle of 110°, so that the surface of the glass fiber filament was coated to the thickness of about 0.25 μm.

Subsequently, the glass fiber strand was formed by bundling the surface-coated glass fiber filament, and the fiber-reinforced resin composite was manufactured by cutting the glass fiber strand to the length of 10 mm.

In the fiber-reinforced resin composite, the glass fiber filaments were present in the impregnation resin to be spaced apart from each other by the separation distance of 0.5 μm, the content of the glass fiber filament was 99.0 wt %, the content of the impregnation resin was 0.6 wt %, and the content of the hydrolyzed γ-amino propyltriethoxysilane was 0.4 wt %.

Comparative Example 1 (Applying a Process of Opening or Widening Fiber Strand Passing or Immersing it Through or in a Separate Impregnation Bath)

While the glass fiber filament that was equal to that used in example 1 was spinning, the glass fiber strand was formed not by coating the surface with the impregnation resin emulsion, but by binding the spun glass fiber filament with the hydrolyzed γ-amino propyltriethoxysilane as the binding agent.

Further, without adding water, 100 wt % of polypropylene resin obtained by mixing polypropylene resin having the weight average molecular weight of 70,000 with polypropylene resin having the weight average molecular weight of 20,000 in the ratio of 1:1 as the impregnation resin was heat-treated at the temperature of 230° C., thus preparing liquid impregnation resin.

Subsequently, the glass fiber strand was subjected to pressure using a roller while being heat-treated. Thereby, the glass fiber strand was opened such that a width thereof was increased five-fold.

Further, the opened glass fiber strand passed through the impregnation bath filled with the liquid impregnation resin, and then underwent cooling and drying processes. The resulting product was cut to the length of 10 mm to manufacture the fiber-reinforced resin composite. Particularly, the diameter of an outlet nozzle of the impregnation bath was 2.0 mm.

In the fiber-reinforced resin composite, the glass fiber filaments were in partial contact with each other, so that it is impossible to measure the separation distance therebetween. The content of the glass fiber filament was 78 wt %, and the content of the impregnation resin was 22 wt %.

Comparative Example 2

The fiber-reinforced resin composite was manufactured under the same condition and method as comparative example 1 except that the diameter of the outlet nozzle of the impregnation bath was 1.5 mm.

In the fiber-reinforced resin composite, the glass fiber filaments were in partial contact with each other, so that it is impossible to measure the separation distance therebetween. The content of the glass fiber filament was 90 wt %, and the content of the impregnation resin was 10 wt %.
Evaluation Various physical properties of the respective fiber-reinforced resin composites according to examples 1 and 2 and comparative examples 1 and 2 were evaluated and are shown in Table 1 below.

Further, in the injection-molding machine (LS-mtron, LGE220∥), the respective fiber-reinforced resin composites according to examples 1 and 2 and comparative examples 1 and 2 and the polypropylene resin pellet (GS-caltex, H550) were properly mixed with each other, so that a mixed composition having the content of the glass fiber of 60 wt % was formed. This was injection-molded to produce a sheet-shaped molded product. Subsequently, various physical properties were evaluated and are shown in Table 1 below.

Experimental Example 1: Separation Distance

Measuring method: the sections of the respective fiber-reinforced resin composites according to examples 1 and 2 and comparative examples 1 and 2 were photographed using Scanning Electron Microscope (EDX Inc., ×8000) and the distance between the glass fiber filaments was measured.

Experimental Example 2: Workability

Measuring method: in the process of manufacturing the respective fiber-reinforced resin composites according to examples 1 and 2, the scattering degree of the glass fiber filaments when the glass fiber strand was cut was visually observed to evaluate the workability.

Further, in the process of manufacturing the respective fiber-reinforced resin composites according to comparative examples 1 and 2, the opened glass fiber strand passed through the liquid impregnation resin, and then underwent cooling and drying processes. The resulting product was cut to the length of 10 mm. At this time, the scattering degree of the glass fiber filaments was visually observed to evaluate the workability.

Specifically, when the scattering degree of the glass fiber filaments was severe, it was evaluated as being inferior in workability and indicated as symbol "X". When the glass fiber filaments were rarely scattered, it was evaluated as being excellent in workability and indicated as symbol "O". Finally, a middle scattering level was evaluated as being normal in workability and indicated as symbol "A".

Experimental Example 3: Pellet Appearance

Measuring method: the appearance of the respective fiber-reinforced resin composites according to examples 1 and 2 and comparative examples 1 and 2 made in the form of the pellet were visually observed and the pellet appearance was evaluated.

To be more specific, in each cutting process, when the fiber filament was not exposed to the outside while maintaining the original column shape, the pellet appearance was evaluated as being excellent and indicated as symbol "O". When the original column shape was not maintained or the fiber filament was exposed to the outside and scattered, the pellet appearance was evaluated as being inferior and indicated symbol "X".

Experimental Example 4: Tensile Strength

Measuring method: the respective sheets formed from the respective fiber-reinforced resin composites according to examples 1 and 2 and comparative examples 1 and 2 were measured using a tensile strength tester (ZwickRoell, Z010) under the condition of ASTM D638.

Experimental Example 5: Impact Strength

Measuring method: the respective sheets formed from the respective fiber-reinforced resin composites according to examples 1 and 2 and comparative examples 1 and 2 were measured using an impact strength tester (ZwickRoell, HIT25P) under the condition of ASTM D265.

nating the resin in the fiber strand, thus realizing excellent production efficiency and economic efficiency. The manufacturing process is simplified, so that it may be clearly expected that time and cost are further reduced. Further, the respective sheets formed from the fiber-reinforced resin composites according to examples 1 and 2 have higher tensile strength or impact strength, so that it can be seen that the dispersibility of the glass fiber filament is excellent.

Meanwhile, the fiber-reinforced resin composite according to comparative example 1 is manufactured by passing through or immersing in the separate impregnation bath. Thus, the glass fiber filaments are in partial contact with each other, so that it is impossible to measure the separation distance therebetween. In addition, the content of the glass fiber filament was low.

Thus, the fiber-reinforced resin composite according to comparative example 1 is low in efficiency of impregnating the resin in the fiber strand, thus realizing excellent production efficiency and economic efficiency. Further, the manufacturing process is divided into two steps, so that time and cost required to perform the manufacturing process are increased. Further, the sheet formed from the fiber-reinforced resin composite according to comparative example 1 has lower tensile strength or impact strength, so that it can be seen that the dispersibility of the glass fiber filament is low.

In addition, the fiber-reinforced resin composite according to comparative example 2 is also manufactured by passing through or immersing in the separate impregnation bath. However, by reducing the diameter of the outlet nozzle provided in the impregnation bath, 90% of glass fiber filament may be contained. However, pellet appearance and workability are considerably poor, so that this is unsuitable as a commercial product.

Moreover, the sheet formed from the fiber-reinforced resin composite according to comparative example 1 causes the agglomeration or cohesion of the glass fiber filament, so that it is easily broken when the tensile strength or the

TABLE 1

|  | Fiber-reinforced resin composite | | | | Sheet | |
| --- | --- | --- | --- | --- | --- | --- |
|  | Content of glass fiber filament (wt %) | Separation distance (μm) | Pellet appearance | workability | Tensile strength (Mpa) | Impact strength (Mpa) |
| Ex. 1 | 93 | 3.62 | O | O | 164 | 29 |
| Ex. 2 | 99 | 0.5 | O | O | 165 | 28 |
| Comp. 1 | 78 | Not measurable | O | O | 163 | 28 |
| Comp. 2 | 90 | Not measurable | X | X | Not measurable | Not measurable |

As shown in Table 1, the fiber-reinforced resin composites according to examples 1 and 2 were manufactured by spraying the impregnation resin emulsion and coating the surface of the fiber filament in the step of spinning the fiber filament prior to forming the fiber strand. Thus, the glass fiber filaments were sufficiently spaced apart from each other, and a higher content of glass fiber filament was contained, and pellet appearance and workability were excellent.

Thus, the fiber-reinforced resin composites according to examples 1 and 2 effectively improve efficiency of impregnating impact strength is measured, and thereby it is impossible to measure physical properties.

DESCRIPTION OF REFERENCE NUMERALS OF IMPORTANT PARTS

100: fiber-reinforced resin composite
110: impregnation resin
120: fiber filament
330: spray nozzle
d: separation distance
θ: spraying angle

The invention claimed is:

1. A method for manufacturing a fiber-reinforced resin composite comprising the steps of:
spinning a plurality of fiber filaments, wherein the plurality of fiber filaments is spun at a speed of from 600 m/min to 700 m/min and the plurality of fiber filaments is an inorganic fiber made of at least one selected from the group of glass fiber, carbon fiber, and a combination thereof;
coating a surface of each of the plurality of fiber filaments by spraying an impregnation resin emulsion onto the plurality of spun fiber filaments, wherein a viscosity of the impregnation resin emulsion is measured by using a Brookfield viscometer and ranges from 6,000 cP to 10,000 cP at 25° C.; and
forming a fiber strand by bundling the plurality of fiber filaments coated with the impregnation resin emulsion, wherein the fiber strand is the fiber-reinforced resin composite, and a separation distance between the plurality of fiber filaments present in impregnation resin ranging from 0.5 μm to 3.62 μm,
wherein the method does not comprise opening or widening the bound fiber strand and the method does not comprise passing or immersing the fiber strand through or in a separate resin impregnation bath.

2. The method according to claim 1, wherein, at the step of coating the surface of each of the plurality of fiber filaments, the surface of each of the plurality of fiber filaments is coated to a thickness of 0.03 μm to 5.5 μm.

3. The method according to claim 1, wherein, at the step of coating the surface of each of the plurality of fiber filaments, the impregnation resin emulsion is sprayed at a spraying angle of 30° to 150°.

4. The method according to claim 1, further comprising:
before the step of forming the fiber strand, a step of performing a step of spraying the impregnation resin emulsion onto the plurality of fiber filaments coated with the impregnation resin emulsion again to coat the surface one or more times.

5. The method according to claim 1, wherein, at the step of coating the surface of each of the plurality of fiber filaments, the impregnation resin emulsion contains no binding agent, or further contains a binding agent therein.

* * * * *